US006763337B1

(12) United States Patent
Verma et al.

(10) Patent No.: US 6,763,337 B1
(45) Date of Patent: Jul. 13, 2004

(54) WEIGHTED WEDGE DEFUZZIFICATION FOR CONCEPTUAL SYSTEM DESIGN EVALUATION

(75) Inventors: Dinesh Verma, Centreville, VA (US); Caroline Smith, Harrisonburg, VA (US)

(73) Assignee: Lockheed Martin Corporation, Bethesda, MA (US)

( * ) Notice: Subject to any disclaimer, the term of this patent is extended or adjusted under 35 U.S.C. 154(b) by 0 days.

(21) Appl. No.: 09/518,213

(22) Filed: Mar. 3, 2000

Related U.S. Application Data

(60) Provisional application No. 60/123,110, filed on Mar. 5, 1999.

(51) Int. Cl.[7] .............................................. G06F 15/18
(52) U.S. Cl. ................................................ 706/9; 706/8
(58) Field of Search ................................ 706/8, 9, 1, 2

(56) References Cited

U.S. PATENT DOCUMENTS

| | | | | |
|---|---|---|---|---|
| 5,446,827 A | * | 8/1995 | Shigeoka et al. ............... | 706/9 |
| 5,546,501 A | * | 8/1996 | Yoshitake et al. .............. | 706/9 |
| 5,561,739 A | * | 10/1996 | Muraji ........................... | 706/9 |
| 5,751,908 A | * | 5/1998 | Madau et al. ................... | 706/4 |
| 5,778,149 A | * | 7/1998 | Eichfeld ......................... | 706/4 |
| 5,852,708 A | * | 12/1998 | Shyu et al. ...................... | 706/9 |
| 5,940,814 A | * | 8/1999 | Jiang et al. ..................... | 706/1 |

OTHER PUBLICATIONS

Verma, D., "A Fuzzy Set Paradigm For Conceptual System Design Evaluation", Virginia Polytechnic Institute and State University, Doctorial Dissertation, Dec. 1994.*

Verma et al.; "Systematically Identifying System Engineering Practices and Methods". IEEE Transactions on Aerospace and Electronic Systems, vol. 33, No. 2, Apr. 1997, pp. 587–595.*

Verma et al.; "Application of Fuzzy Logic In The Assurance Sciences". 1994 Proceedings Annual Reliability and Maintainability Symposium, Jan. 1994, pp. 436–441.*

Verma et al.; "Analyzing a Quality Function Deployment (QFD) Matrix: An Expert System Based Approach to Identify Inconsistencies and Opportunities". Journal of Engineering Design, vol. 9, Iss 3, Dec. 1998, pp. 1–9.*

* cited by examiner

Primary Examiner—Wilbert L. Starks, Jr.
Assistant Examiner—Kelvin E Booker
(74) Attorney, Agent, or Firm—Venable LLP; Andrew C. Aitken

(57) ABSTRACT

A method, and a system applying the method, for an exact and computationally efficient solution for defuzzification uses linear and non-linear weighted wedge approaches. Fuzzy numbers are used to represent parameters in a number of applications, including design dependent parameters (DDPs) for a project in particular. A defuzzification technique is used within the domain of fuzzy logic, fuzzy set theory, and multi-valued logic to overcome the problem of the lack of absolute ordering of a fuzzy number representation. The requirement profile for the DDP (the fuzzy representation of customer requirements) is compared to the anticipation profile for the DDP (the fuzzy representation of expected performance) in three dimensions. In two dimensions, the area of overlap between the DDP requirement profile and the DDP anticipation profile represents how well the customer requirements have been met. In three dimensions, the area of overlap is projected onto a wedge to obtain a volume of overlap, in order to give higher preference to higher DDP values than lower DDP values in the area of overlap, for a more accurate analysis. The wedge can also be made non-linear in shape, to provide added sensitivity analysis to desired results.

23 Claims, 7 Drawing Sheets

COMPLIANCE BETWEEN PREFERENCE & ANTICIPATION PROFILES FOR DESIGN PARAMETERS.

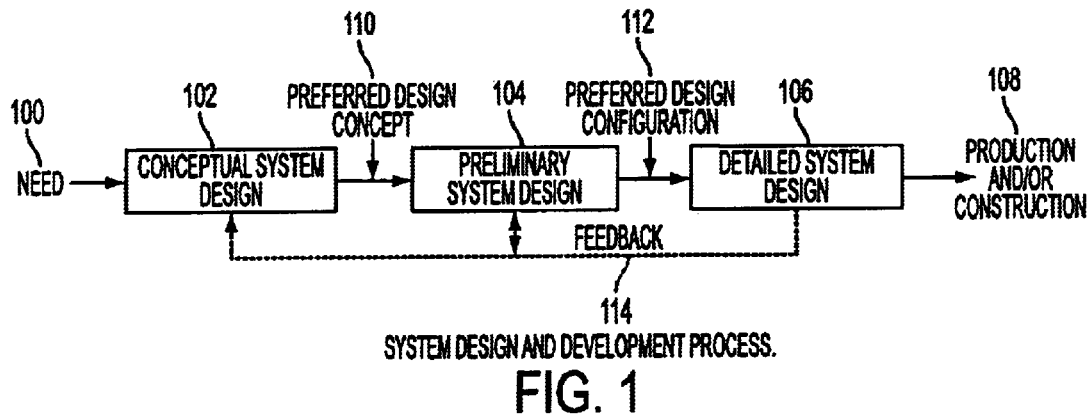

LINGUISTIC SCALE FOR ASSIGNING FUZZY PRIORITIES TO CUSTOMER REQUIREMENTS.

FUZZY QFD MATRIX SCHEMATIC.

DESIGN CONCEPT/CRITERION FEASIBILITY ASSESSMENT.

COMPLIANCE BETWEEN PREFERENCE & ANTICIPATION PROFILES FOR DESIGN PARAMETERS.

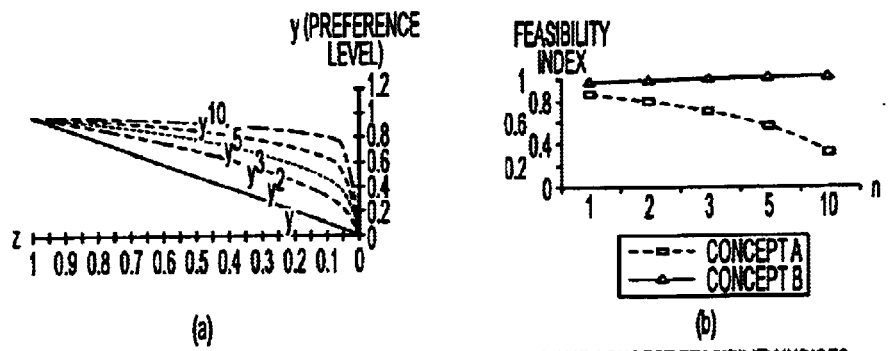

(a)          (b)

APPLICATION OF A NON-LINEAR PROJECTION PLANE TO COMPUTE CONCEPT FEASIBILITY INDICES

FIG. 9

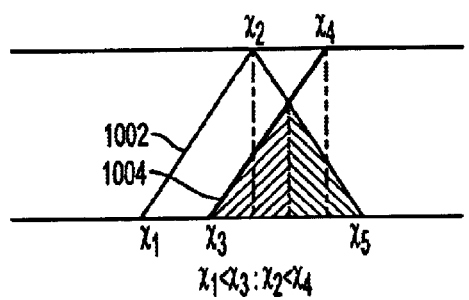

$x_1 < x_3 ; x_2 < x_4$

CASES OF RELATIONSHIP BETWEEN
ANTICIPATION AND REQUIREMENTS PROFILE

FIG. 10A

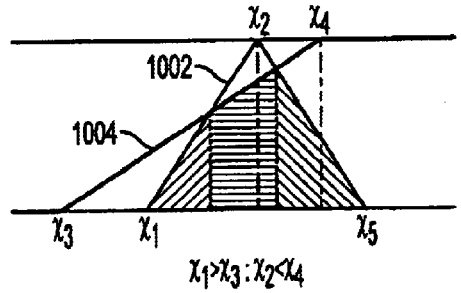

$x_1 > x_3 ; x_2 < x_4$

CASES OF RELATIONSHIP BETWEEN
ANTICIPATION AND REQUIREMENTS PROFILE

FIG. 10B

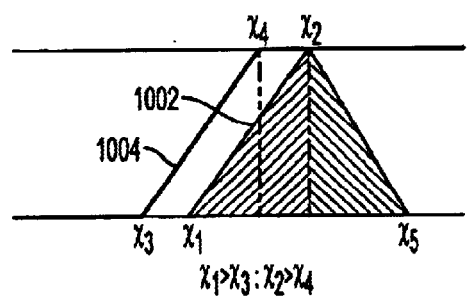

$x_1 > x_3 ; x_2 > x_4$

CASES OF RELATIONSHIP BETWEEN
ANTICIPATION AND REQUIREMENTS PROFILE

FIG. 10C

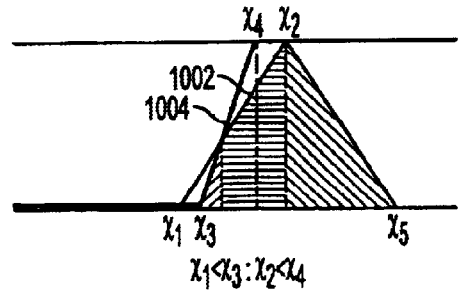

$x_1 < x_3 ; x_2 < x_4$

CASES OF RELATIONSHIP BETWEEN
ANTICIPATION AND REQUIREMENTS PROFILE

FIG. 10D

PROJECTION OF A TRIANGULAR ANTICIPATION PROFILE ONTO AN INCLINED PLANE.

WEIGHTED WEDGE DEFUZZIFICATION FOR CONCEPTUAL SYSTEM DESIGN EVALUATION

The following patent document claims priority to provisional application serial number 60/123,110, filed Mar. 5, 1999.

BACKGROUND OF THE INVENTION

1. Field of the Invention

The following invention relates to determining and analyzing fuzzy conceptual design alternatives, and specifically to applying a volumetric defuzzification approach in conceptual design.

2. Related Art

Modern companies pursue ever increasingly innovative and thoughtful approaches to generating design alternatives that fit customer needs. This applies across many types of companies, producing many types of products, from intellectual products like software, to manufacturing of cars. Decision making must be responsive to customer needs, and strategic, from conceptual system design, to preliminary system design, and finally to a detailed system design leading to production and construction.

For conceptual design, the evaluation methodology includes a number of strategic decisions and applies to the many processes of any given company, including but not limited to manufacturing distribution, deployment, installation, operations, sustaining maintenance, support and disposal.

A noted modern approach to conceptual design uses Pugh's approaches. (See S. Pugh, "The application of CAD in relation to dynamic/static production concepts," Proc Int Conf Eng Des, Copenhagen, August 1983, pp. 564–571; S. Pugh, "Total design: Integrated methods for successful product engineering," Addison-Wesley, New York, 1991.) Evaluation criteria are delineated based on need analysis, aided by design methods. The initial design is subjected to a "controlled convergence" process, facilitated by a concept selection matrix.

Pugh's method analyzes the customer's need and generates a requirements definition. A crisp, exact feasible design envelope is created, within which potential system design concepts are generated. From the potential design concepts, a conceptual design selection matrix is then generated. The potential design concepts consist of a number of identified, crisp variables, called Design Dependent Parameters (DDPs). The DDPs are application specific, since the design pertains to the particular technological or industrial process, and the items being investigated pertain to one or more items within that process. Exemplary DDPs are reliability, maintainability, environment compliance, visual quality, and safety.

A number of modem techniques have applied fuzzy techniques to Pugh's crisp solutions. Instead of using crisp definitions for DDPs, fuzzy, linguistic, more human definitions are applied. For example, a crisp definition for the reliability of a machine can be whether the mean time before failure (MTBF) is "40,000 hours." On the other hand, a fuzzy definition for the reliability MTBF can be "approximately 40,000, " where the meaning of the set "approximately 40,000" depends upon how fuzzy (or alternatively crisp) the linguistic definition is meant by the user. For example, for a very fuzzy set, even the value 80,000 may have a non-zero profile value associated with it, such that it is covered under the umbrella of "approximately 40,000." On the other hand, for a less fuzzy (more crisp) set, "approximately 40,000" may have non-zero profile values only between 39,900 and 40,100.

After the DDPs are identified, defuzzification techniques must be applied to compare fuzzified variables. Suppose the DDP in question is the reliability parameter. The fuzzy value for the anticipated reliability profile (the reliability anticipated by the product designer) is compared to the reliability requirement profile (the reliability required by the customer's needs). Existing defuzzification approaches are not applicable to this problem since the objective in this case is not to create an ordering between the fuzzy profile, but rather to compare them from the perspective of compliance. Accordingly, none of the previous techniques have properly accounted for sensitivity, meaning that when the input is mapped to the output, the difference between the results from the various inputs is non-trivial in nature. What is required is an exact, more satisfactory way to defuzzify the parameters, in addition to providing sensitivity analysis.

SUMMARY OF THE INVENTION

The present invention is directed to a method, and a system for employing the method, for determining compliance for a feasible design dependent parameter (DDP) between an anticipated DDP fuzzy profile and a required DDP fuzzy profile. The method includes (a) creating a weighted wedge by projecting an image of a surface common to the anticipated DDP fuzzy profile and the required DDP fuzz profile at an angle from the surface; and (b) finding an overlap volume of the weighted wedge between a projection of the anticipated DDP fuzzy profile onto the image and a projection of the required DDP fuzzy profile onto the image.

The angle can be calculated in a manner to make the overlap volume greater if any one of the anticipated DDP fuzzy profile and the required DDP fuzzy profile have projections with higher respective preference levels. The method can also include generating a feasibility index for the DDP by dividing the overlap volume by a volume obtained from the projection of the anticipated DDP fuzzy profile.

The common surface can be a linear projection plane. The common surface can also be a non-linear projection plane designed to provide relatively greater differences between one or more of the overlap volumes at higher respective preference levels for any one of the anticipated DDP fuzzy profiles and the required DDP fuzzy profiles.

The method can be part of larger system, which includes the following processes: (a) determining a feasible design space for a design concept by finding one or more DDPs for the concept; (b) determining one or more feasible DDPs for the design space, including applying the above creating step and finding step one or more times; and (c) rating and ranking feasible design concepts by consolidating relative priorities of the one or more feasible DDPs.

The invention will be understood by those skilled in the relevant art from the descriptions provided below, though various changes in form and details may be made without departing from the spirit and scope of the invention.

BRIEF DESCRIPTION OF THE FIGURES

The present invention will be described with reference to the accompanying drawings, wherein:

FIG. 1 is a block diagram illustrating system design and development process;

FIG. 2 illustrates an exemplary concept selection matrix;

FIGS. 9A and 9B are graphical illustrations of non-linear projection planes used in place of a flat wedge to compute feasibility indices;

FIGS. 10A, 10B, 10C and 10D respectively illustrate the four cases for the relationships between requirement profiles and anticipation profiles.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 3:
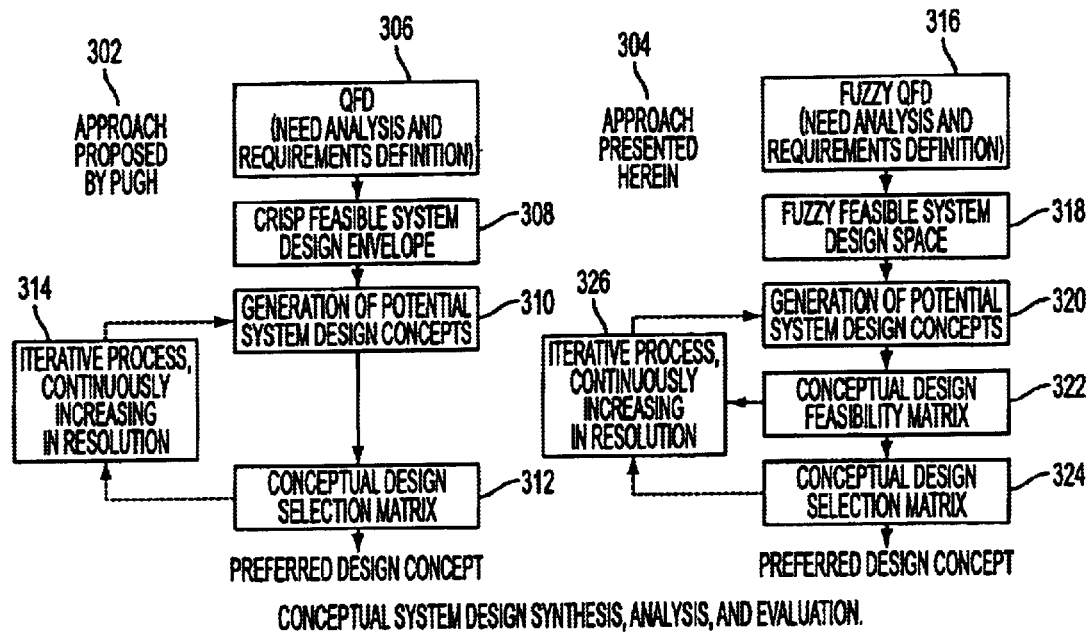
FIG. 3 is a block diagram illustrating the conceptual system design synthesis, analysis and evaluation process.

In the following description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

I. Background of Fuzzy Set Theory Application to Design and Overview of the Present Invention The present invention is described in the context of development and design applications. An example is a system to facilitate interactive sessions/meetings between remote parties. Those skilled in the art will recognize, however, that the present invention can be applied across a wide array of applications in various fields, for the concepts presented herein have relevance to skilled artisans a variety of disciplines.

Identification of a need or functional/performance deficiency initiates conceptual design. Methods known to those skilled in the art include Quality Function Deployment (QFD), Checklists and Taxonomies (CAT), and Input/Output Matrices (IOM). Each provide a framework for translating a need into specific qualitative and quantitative customer requirements. Subsequently, design concepts and technical solutions are then generated to address these requirements.

The present invention represents an extension of ongoing research in the application of fuzzy set methods to evaluate design concepts. Since, imprecision and vagueness characterize the nascent design phase, the QFD method and Pugh's concept selection process are modified and extended with concepts from fuzzy set theory. Pugh proposed a methodology for the synthesis and selection of conceptual designs in the early 1980s. (See the above references.)

The QFD method, which was originally developed as a design tool in 1972 at the Kobe Shipyard of Mitsubishi Heavy Industries, Ltd., involves an attempt to identify an applicable and prioritized set of subjectively stated customer desired attributes. These subjective attributes drive the subsequent identification of a more objective (and correlated) set of quantitative and qualitative engineering characteristics.

The method provided herein provides a rigorous mechanism for dealing with imprecise requirements and priorities, as well as the subjective correlation between customer and design requirements. Furthermore, the approach presented herein is discussed from the perspective of invoking Taguchi's loss function during conceptual system design in an innovative fashion.

Evaluating design alternatives continues to be an important research focus. However, most of the work is directed to preliminary and detail design. A survey of selected research activities on design analysis and evaluation is included in: H. R. Parsaei and W. G. Sullivan (Editors), "Concurrent engineering: Contemporary issues and modem design tools," Chapman and Hall, New York, 1993; and D. Verma and J. Knezevic, "Application of fuzzy logic in the assurance sciences," Proc Reliab Maintainability Symp, Anaheim, Calif., January 1994, pages 436–441.

FIG. 1 is a block diagram illustrating system design and development process. FIG. 1 includes need 100, conceptual system design 102, preliminary system design 104, detailed system design 106, production and/or construction 108, preferred design concept 110, preferred design configuration 112, and feedback 114.

The needs 100 are input to conceptual system design 102. The evaluation methodology for conceptual designs includes a number of decisions. The decisions during the design concept stage are strategic, and impact preliminary and detail design along with manufacturing, distribution, deployment, installation, operations, sustaining maintenance, support, and disposal. Rigor and discipline during the later design and development phases cannot compensate for an ill-conceived concept, or for premature commitments made during conceptual design.

A preferred design concept 110 is the result of a well thought-out concept system design 102. The preliminary system design 104 accepts the preferred design concept 110 and yields a preferred design configuration 112. The actual detailed system design 106 is based on this preferred design configuration 112, and yields the production and/or construction 108, the output of the design and development process. It should be noted that the detailed system design 106 provides feedback 114 to conceptual system design 102 and preliminary system design 104, while preliminary system design 104 itself provides feedback to conceptual system design 102.

The conceptual design analysis and evaluation process 102 was first addressed by Pugh (referenced above). The approach delineates the evaluation criteria based on need analysis, aided by design methods such as QFD. The initial set of design concepts is subjected to a "controlled convergence" process, facilitated by a concept selection matrix.

FIG. 2 illustrates an exemplary concept selection matrix. The matrix includes conceptual system design alternatives 204, numbered 1–7. Each design alternative 204 pertains to a set of criteria 202, labeled A–E. This matrix is populated with symbols 206, reflecting the performance of each concept/criterion instance. For example, "S" indicates the alternative is on par with the requirements criteria, "+" indicates the alternative is better than the requirements criteria, and "−" indicates the alternative is lower than required. The criteria axis 202 also includes the summations of the total number of S's, +'s, and −'s.

The imprecise evaluation proposed by Pugh facilitates identification of likely concepts. It has been recommended that good design concepts be studied further with the objective of compensating for, or removing, any weakness or undesirable features. Simultaneously, weak concepts should be studied for improvements. This process often results in additional, but modified, concepts.

FIG. 3 is a block diagram illustrating the conceptual system design synthesis, analysis and evaluation process, specifically for Pugh's method 302 and for the method of the present invention 304.

Pugh's method begins with a QFD need analysis and requirement definition 306. A crisp, feasible, design 308 is derived from the QFD definition 306. Crispness refers to the fact that exact definitions, variables, and designations are used, versus fuzzy values. Potential system design concepts 310 (the same as step 102 above) are generated from the crisp feasible design 308. A conceptual design matrix (analogous to design matrix 204) is generated in step 312 from the system design concepts of step 310. Step 314 shows that the interplay between the conceptual design selection matrix 312 and generation of system design concepts 310 is an iterative process, continuously increasing in resolution.

The approach of the present invention 304 includes parallel steps to Pugh's method, except that fuzzy analysis and system design are used, instead of crisp definitions. The parallel steps include step 316 (fuzzy QFD analysis and requirements definition), step 318 (fuzzy feasible system design space determination), step 322 (conceptual design selection matrix), and step 326 (iterative process of continuously increasing resolution step). In addition, the present invention generates a conceptual design feasibility matrix in step 322, between steps 320 and 324. This matrix reflects the "delta" (difference) between required and projected (fuzzy, probabilistic, or deterministic) parameter values for each concept, which will be made more clear below. A process of controlled convergence, concept evaluation, generation, and subsequent evaluation is repeated until the strongest concept emerges. Principles of fuzzy set theory and fuzzy calculus have been applied from D. Verma, "A fuzzy set paradigm for conceptual system design evaluation, Doctoral Dissertation, Virginia Polytechnic Institute and State University, Blacksburg, Va., December 1994. The present invention is further developed below.

Figure 4:
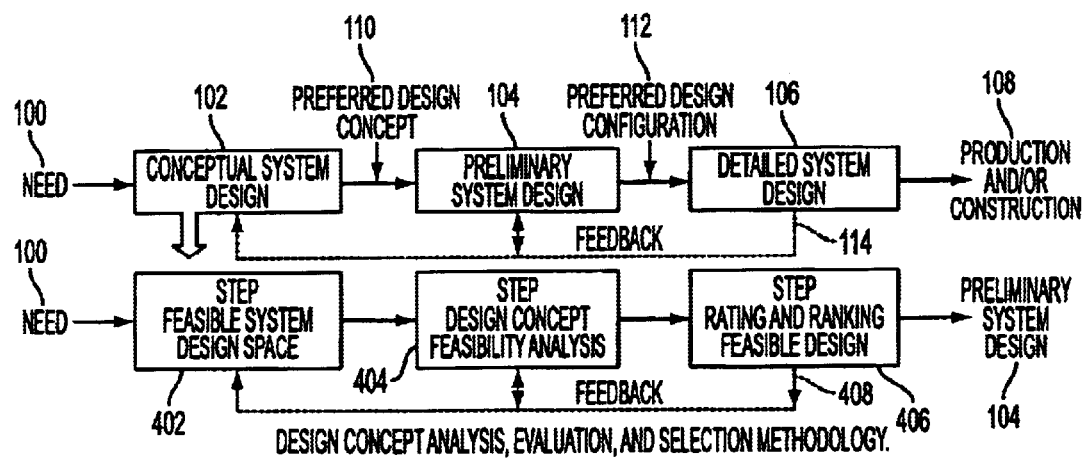
FIG. 4 is a block diagram illustrating how the present invention fits into the system design and development process of FIG. 1.

FIG. 4 is a block diagram illustrating how the present invention fits into the system design and development process of FIG. 1, by a directed concept analysis design, evaluation, and methodology. A disciplined design process is essential for effective and efficient development of systems which are both responsive to customer needs and globally competitive. Specifically, the invention is directed to the steps between conceptual system design stage 102 and preliminary system design step 104, or the development of the preferred design concept 110.

As noted, the conceptual system design 102 is generated from need 110. From the conceptual system design 102, a feasible system design space is generated in step 402. From this is generated a design concept feasibility analysis in step 404. After this, a rating and ranking of feasible design step 406 is performed. Steps 406 and 404 feed back to steps 402 and 404 in an iterative, self-correcting, increasing resolution process 408. The remainder of the discussion details steps 402, 404 and 406. Application of concepts from fuzzy set theory facilitates comprehensive and enhanced richness in the design specific information captured and conveyed to the design team.

II. Step 402: Feasible System Design Space Generation

Initially, a need or deficiency (functional upgrade or performance improvement) initiates conceptual design. Identifying the need initiates the entire design phase. Need identification, if done through prudent and systematic exploitation, can often lead to a more competitive position in the marketplace.

Critical to this step is resisting premature commitment to configuration and concept, by defining need through functional terms. A preferred way to identify a need would be such as "A car is needed for transportation of four people. . .", which identifies the "what" (transportation of four people) and the "how" (the car). Another example, used below, is: an organization needs a system to facilitate an interactive session/meeting between multiple remote parties.

During need analysis, an initially identified need or deficiency is examined to further specify its nature, preferably from a life-cycle perspective. In the present invention, the QFD method is used in such a way as to incorporate the imprecision and vagueness inherent during the requirements phase of the system design phase. It is referred to as a fuzzy QFD, and is described with respect to FIG. 6 below.

Design dependent parameters (DDPs) are used to reflect the design requirements. They are used in the fuzzy QFD to provide a strong correlation with the customer wants and desires. This need is analyzed and translated into specific customer requirements. Priorities are assigned to these requirements (by stakeholders) before correlating them with design requirements (represented by design parameters).

Competitive systems/products are bench-marked and technically assessed prior to assigning target values to the design parameters. The fuzzy QFD matrix is the product of these activities. The customer requirements are identified in subjective and imprecise terms and then linked with an associated fuzzy DDP. Each design and development effort will likely yield a unique set of DDPs, some having a numeric base variable (such as speed, weight, space) and some have no numeric base variable (such as user friendliness, aesthetics).

Numeric DDPs can be further classified into two groups, the first assuming values on the real number line (such as weight, size) and the second taking its values in the interval [0,1] (such as reliability). The mechanism for assigning target values to the DDPs, and thereby defining the feasible design space, depends upon their inherent nature (e.g., numeric versus non-numeric, continuous versus discrete).

Figure 5A:
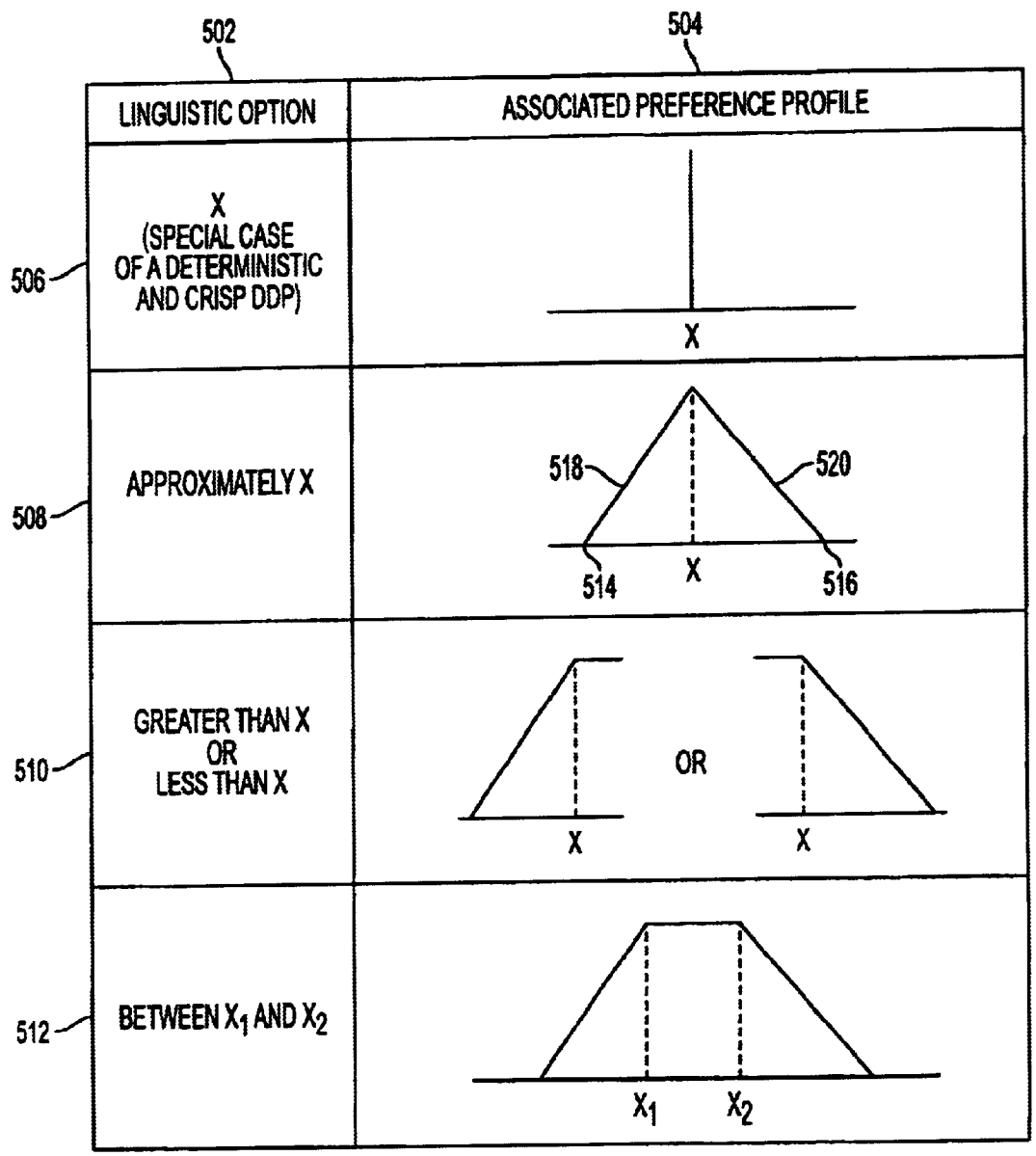
FIG. 5A illustrates an exemplary fuzzy representation using linguistic options for numeric design dependent parameters.

The DDPs are given fuzzy representations. FIG. 5A illustrates an exemplary fuzzy representation (using linguistic options) for numeric DDPs. FIG. 5A includes the linguistic options 502, along with the fuzzy representations of the preference profiles 504. Linguistic option 506 is "X" (an actual, crisp value), shown as a line at point X on the abscissa. Linguistic option 508 is "Approximately X", shown as having a highest normalized value of 1 at X on the abscissa, and values of 0 below 514 and above 516 on the abscissa.

In English, this indicates the set of numbers that fit the category "Approximately X", with the value X providing the "best" fit (at 100%), and values below 514 and above 516 having the "worst" fit (at 0%). For example, if X is the number 2, then the actual number 2 is definitely in the set of "approximately 2", the number 3 is probably within the set approximately 2, and the number 1000 is probably not in the set approximately 2. The size of the set, which is how "fuzzy" the set is, depends upon the slope of the lines 518, 520. When the slopes are low in value (more horizontal), the set is more fuzzy, and it is more likely that numbers widely varying from X will be in the set. When the slopes are high in value (more vertical), the set is less fuzzy, and it is less likely that numbers widely varying from X will be in the set. The highest slope would be for a crisp, deterministic point, such as X as shown in 506, where the two lines 518, 520 collapse into one line.

Using the same reasoning and interpretations, linguistic option 510 is "Greater Than X" or "Less Than X", and linguistic option 512 is "Between X1 and X2."

Figure 5B:
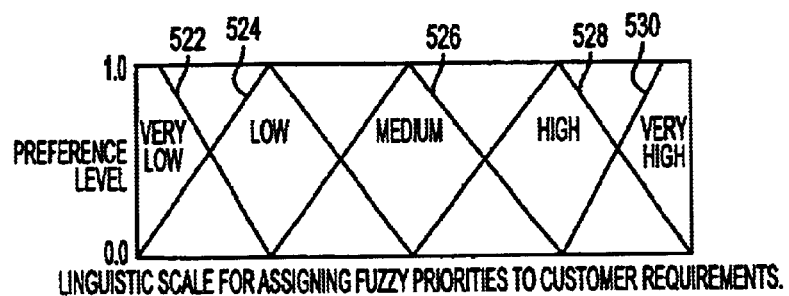
FIG. 5B illustrates an exemplary representation of Design Dependent Parameters that map into the linguistic scale interval [0,1]

FIG. 5B illustrates an exemplary representation of DDPs that map into the linguistic scale interval [0,1]. The preference level in the interval [0, 1] is the ordinate, and the linguistic scale [0,1] is the abscissa. The linguistic representations for "very low" 522, "low" 524, "medium" 526, "high" 528, and "very high" 530 are shown. These linguistic scales are used to assign priorities to customer requirements, correlate requirements with design parameters, and benchmark customer perceptions.

Figure 6:
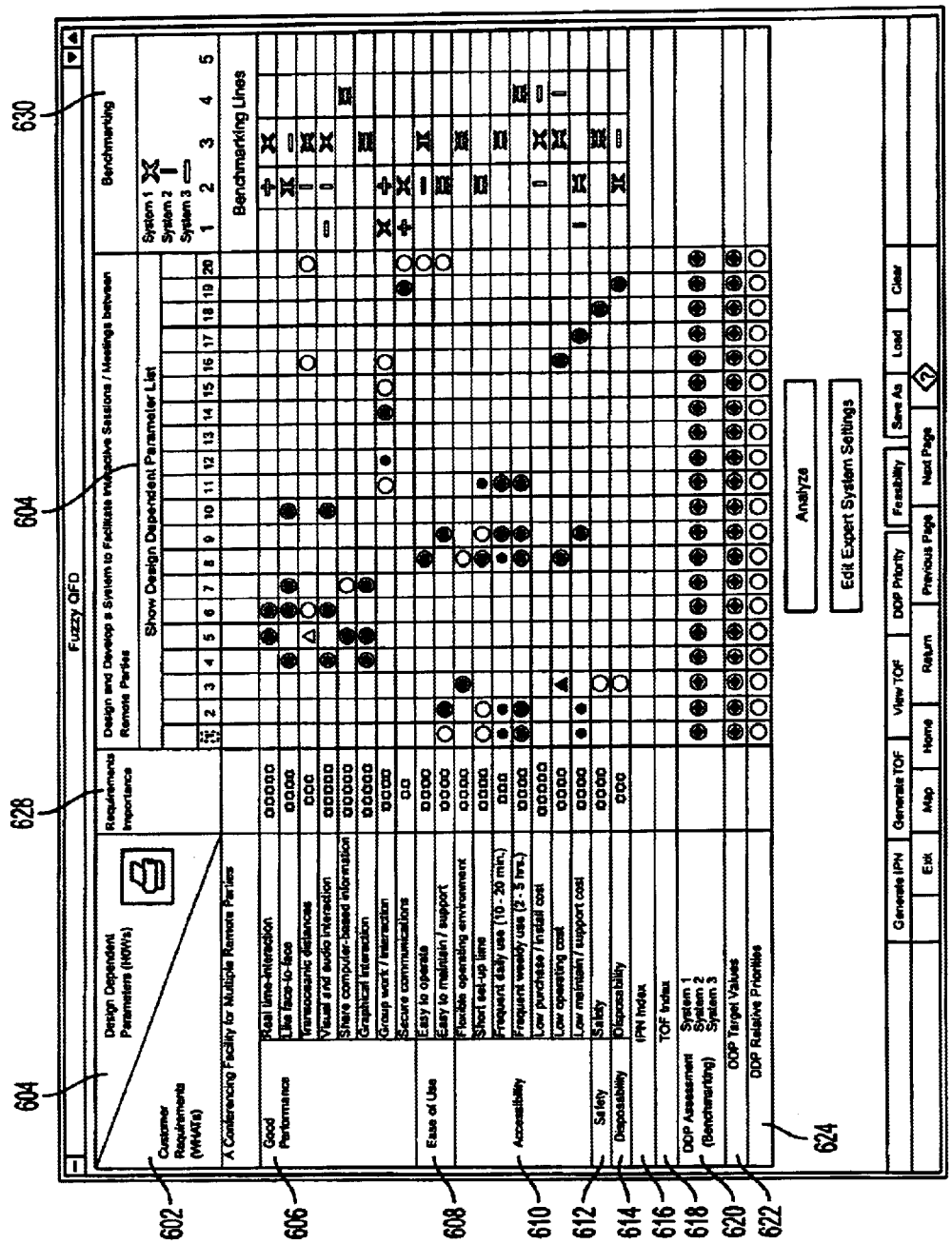
FIG. 6 illustrates an exemplary fuzzy Quality Function Deployment matrix.

FIG. 6 illustrates an exemplary fuzzy QFD matrix for the application: a system to facilitate interactive sessions/meetings between remote parties. This matrix includes the relationship between customer requirements 602, listed on the left, as they correspond to DDPs 604, listed on top. The components of the QFD matrix of FIG. 6 are set forth in Table 1, which clarifies the steps in obtaining the QFD matrix.

TABLE 1

| QFD Matrix Step | Description |
| --- | --- |
| (1) Identification of Customer Requirements | The customer's "what" is identified, subjectively stated, and grouped in an effort to form a logical hierarchy of related customer requirements. The customer requirements have general categories (including good performance 606, ease of use 608, accessability 610, safety 612, disposability 614). The general categories have specific customer requirements corresponding to them. For good performance 606, these are real time-interaction, like face-to-face, transoceanic distances, etc. Requirements performances have numbers for their linguistic representations in field 628. For example, 1 represents not important, 5 represents very important. |
| (2) Identification of Design Dependent Parameters (DDPs) | Relevant DDPs are identified, which are also called engineering characteristics, technical performance measures, or design requirements. Exemplary DDPs and their values are provided in Table 2. |

TABLE 1-continued

| QFD Matrix Step | Description |
| --- | --- |
| (3) Correlation of Customer Requirements and DDPs | The DDPs are listed in the DDP parameter list field 604. This step ensures that DDPs are identified that address and impact each and every customer requirement. The assessment is made subjectively. Under the DDP parameter list, labeled 604, correlation labels are provided. The correlations labels are defined as follows: (1) very low (darkened triangle); (2) low (open triangle); (3) medium (open circle); (4) high (circle with dot in center); and (5) very high (darkened circle). |
| (4) Benchmarking Existing Capabilities from Customer's Perspective | This step is performed in order to determine the extent of improvement necessary in the capability being designed and developed. In this step the currently available solutions are identified, and then customer perceptions of how these capabilities satisfy customer requirements are benchmarked. In benchmark area 630, satisfaction levels are linguistically represented by numbers 1–5, where 1 is dissatisfied, and 5 is very satisfied. |
| (5) Assessment of DDP Values | In this step, values are assessed for DDPs as they pertain to existing capabilities. These exemplary values are provided in the "Exemplary Values" of Table 2. |
| (6) Delineating Target Values for DDPs | This step involves the definition of design requirements for the system design and development, impacting subsequent synthesis, analysis and evaluation activities. |

Table 2 provides exemplary DDPs used in the application described with respect to FIG. 6 and Table 1 above. Exemplary real-life values for each DDP are provided.

TABLE 2

| Exemplary Design Dependent Parameters (DDPs) | Exemplary Values |
| --- | --- |
| Reliability | Approximately 30,000 hours |
| Maintainability | Less than 1.5 hours |
| Environmental Compliance | Very High |
| Visual Quality | Very High |
| Data (Graphic) Transfer Rate | Approximately 64 |
| Audio/visual Synchronization | Approximately 400 |
| Color Capability | 256 |
| Skill Level (Operation) | Low |
| Skill Level (Maintenance) | Medium |
| Audio Quality | Medium |
| Communication Initiation Time | Less than 3 |
| Maximum Group Size | 2 |
| Simultaneous Groups Active | Approximately 100 |
| Maximum Membership Size | Greater than 1000 |
| Design/production Cost | Approximately 2200 |
| Operating Cost | Approximately 720 |
| Support/maintenance Cost | Approximately 10 |
| Safety | High |
| Disposability | Medium |
| Communication Security | Medium |

Two mechanisms are used as aids to develop the subjective, yet critical processes presented in Table 1. These two mechanisms (provided as indices) are used to facilitate assignment of target values to DDPs.

The first is Improvement Potential and Necessity (IPN), which provides insight into the extent of improvement desirable and necessary for each of the DDPs. The IPN index is computed to indicate the potential of a parameter to improve customer satisfaction, along with this improvement necessity. Accordingly, IPN is a function of customer satisfaction, and correlation between customer requirements and design parameters.

For finding IPN, a matrix is developed to correlate (a) the customer satisfaction levels and (b) the levels of correlation between customer requirements and DDPs. The customer satisfaction levels (a) are for example (1) dissatisfied, (2) unsatisfied, (3) satisfied, (4) rather satisfied, and (5) very satisfied. The levels of correlation (b) are for example the circles and triangles shown under parameter list 604 of FIG. 6, representing (1) very low (darkened triangle); (2) low (open triangle); (3) medium (open circle); (4) high (circle with dot in center); and (5) very high (darkened circle). The IPN Index can be provided in field 614.

The second mechanism is Tolerance of Fuzziness (TOF), which provides the design team with insight into the amount of fuzziness which could be tolerated for each of the DDPs. When assigning target values to parameters, it is necessary to specify a preferred value and, if applicable, a tolerance band.

The TOF index for every DDP, computed as a function of its IPN index and the importance of correlating customer requirements, suggests the acceptable width of these tolerance bands. A high TOF index value suggests little acceptable variation. In the extreme case, a value of unity suggests a "crisp" requirement. Table 3 provides the steps in determining the TOF for the present invention, which can be provided in field 618.

TABLE 3

| Tolerance of Fuzziness (TOF) Step | TOF Step Description |
|---|---|
| Step 1 | Every instance of a fuzzy label, representing the IPN of a DDP on the QFD matrix is multiplied by the fuzzy label representing the importance of the associated customer requirement. Relative linguistic labels are manipulated to yield the TOF for the DDP. |
| Step 2 | The output profiles from step 1 are consolidated. Then, the maximum fuzzy number is extracted from the consolidated combination. |
| Step 3 | To derive a crisp value of the TOF index, the maximum fuzzy number is defuzzified to generate a crisp output with a value in the interval [0, 1]. The Center of Gravity approach, known to skilled artisans, or other approaches such as the inventive use of a weighted wedge can be used for defuzzification. |

Technical assessments of competing systems/products and IPN and TOF values provide valuable insight when assigning target values to design parameters. Target values or requirements may be specified as normal and convex fuzzy profiles, depicting a preferred value with a tolerance band and varying levels of acceptability.

Figure 7:
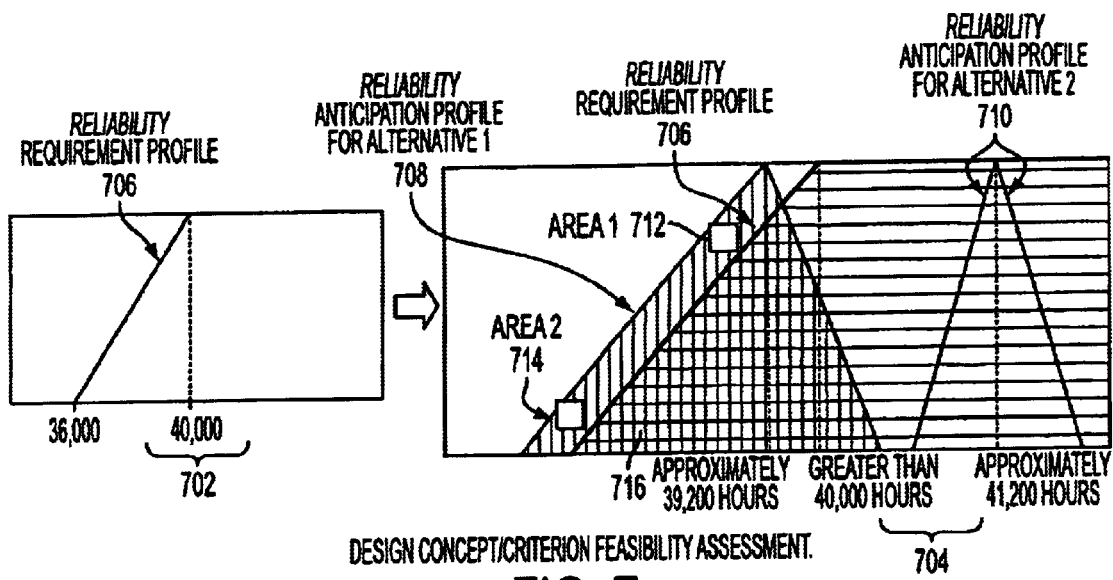
FIG. 7 graphically illustrates a design concept/criterion feasibility assessment for the present invention.

For example, suppose the DDP is Reliability. A Reliability requirement may for example be specified as "Greater Than 40,000 Hours Mean Time Before Failure (MTBF)." This is shown graphically in FIG. 7, portion 702. FIG. 7 graphically illustrates a design concept/criterion feasibility assessment for the present invention. Portion 702 of FIG. 7 illustrates the fuzzy representation of a DDP requirement profile, where Reliability is the exemplary DDP. The Reliability requirement profile (line 706), representing the customer's requirements, is defined as follows:

$$y = 0, \quad x \leq 36,000$$
$$y = x/4000 - 9, \quad 36,000 \leq x \leq 40,000$$
$$y = 1, \quad x \geq 40,000$$

The target values for the DDPs specify the feasible design space. All feasible (or possible) concepts must fall in this space. Those skilled in the art will recognize that in the context of the present invention, selected DDPs may also have a "crisp" value, with no acceptable variation (i.e., no "fuzziness").

III. Step 404: Design Concept Feasibility Analysis

Whereas step 402 was used to determine the target values for the DDPs (i.e., all possible feasible system designs), step 404 is used to determine the actual feasibility for the DDPs.

According to Pugh's methodology, design concept feasibility analysis correlates with controlled convergence. Its intent is to "screen out" infeasible design concepts, leaving behind the feasible designs.

In the present invention, design parameter values for potential concepts may be formulated as fuzzy or stochastic predictions and estimations. More often than not, the resolution and information content during conceptual design may allow only fuzzy and subjective estimations and predictions. Feasibility assessment of design concepts involves the analysis of fuzzy profiles representing required and predicted/estimated DDP values.

Also, normalizing the probability density function can fuzzify any stochastic estimations. The requirements for fuzzy numbers is that they be normalized (i.e., between 0 and 1, inclusive, in value) and that they be convex functions. Hence, the DDP Reliability may be expressed as "Approximately 39,200 Hours MTBF" (for a first alternative) or "Approximately 41,200 Hours MTBF" (for a second alternative). The second portion of FIG. 7, section 704, illustrates these alternatives in detail.

First, the Reliability requirement profile (line 706), which represents the customer's requirement for the DDP Reliability, is shown. Two anticipation profiles for the same DDP (Reliability) are illustrated. The anticipation profile represents the anticipated performance for the DDP in question.

To determine the amount of compliance between the reliability required by the customer 706 and the reliability anticipated by the designed product 708 (or 710), the areas of overlap between (1) the area to the right of the reliability requirement profile, and (2) the area to the right of the reliability anticipation profile 708 (or 710) are observed.

For the first anticipation profile 708, a shaded area 716 represents the area of overlap. Here, there is no complete compliance, because the entire area of the anticipation profile 708 is not within the area of the requirement profile 706. For the second anticipation profile 710, there is complete compliance, because the entire area of the anticipation profile 710 is within the area of the requirement profile 706.

As shown, the overlap (or lack thereof) between required and anticipated (or predicted) profiles suggests the degree of compliance between the predicted and required values of DDP. However, an analysis of the overlap area does not consider varying preference levels associated with a given fuzzy profile. In other words, the area measure alone, in two dimensions, does not completely capture the level at which preference levels are met. The preference level refers to the height of the profile, the higher the value at a given abscissa value, the greater the preference level.

The present invention provides for a more accurate compliance analysis (or feasibility assessment) by addressing not only the overlap area, but also the nature of the overlap, by location on the Cartesian plane. From a design perspective, a unit area of non-overlap at higher preference levels, such as Area 1 (labeled 712) is less desirable than a unit area of non-overlap at lower preference, such as Area 2 (labeled 714). For overlap areas, the desired results are the opposite, namely preferring a higher preference for a higher area, and a lower preference for a lower area.

Figure 8:
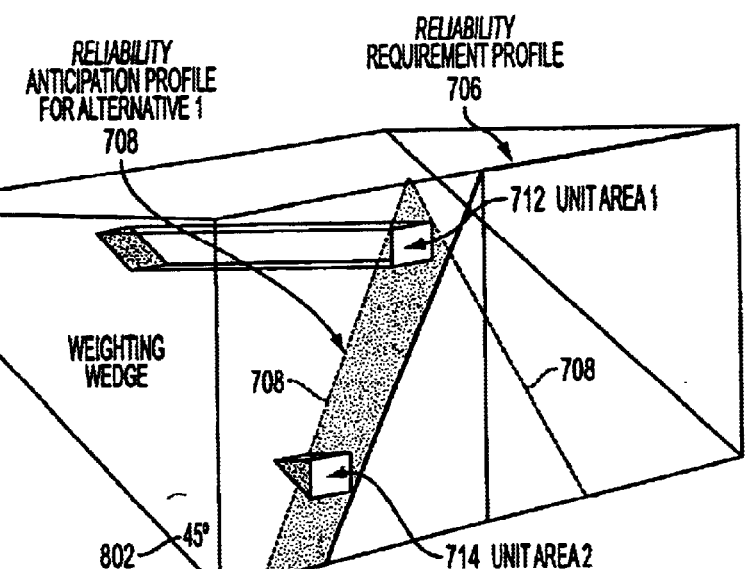
FIG. 8 is an exemplary illustration of how a weighted wedge is used to calculate a volume for overlap areas for a reliability requirement profile and a reliability anticipation profile.

FIG. 8 is an exemplary illustration of how a weighted wedge is used to calculate a volume for the areas. FIG. 8 includes reliability anticipation profile 708, reliability requirement profile 706, unit area 712 and unit area 714 in three dimensions. An angle 802 (having exemplary value 45 degrees) is between the opposing faces of the wedge. The volume of an exemplary area (e.g., area 712, area 714) is calculated by projecting the area from one side of the wedge onto the opposite side of the wedge. Hence, the volume of the projection of area 712 (having higher preferential value) is noticeably greater than the volume of the projection of area 714 (having lower preferential value).

Hence, the differences in the importance of the area of overlap as a function of its location is "captured" by a weighting wedge with a projection plane inclined at for example 45 degrees, as shown. The approach involves a volumetric analysis.

A Feasibility Index (FI) can be used for assessment of the potential concepts. This is generated by comparative analysis of the anticipation and preference profiles for every DDP, and for each concept. The computation of a Feasibility Index (FI) value for each concept/DDP can be henceforth calculated. Accordingly, FI for Reliability may be computed as:

$FI_{n(Reliability)}$=(Projected overlap volume for the Reliability parameter of nth concept)/(Total projected volume of Reliability prediction (or anticipation) profile for the ith DDP of nth concept)

To perform the volumetric analysis, it is necessary to initially determine the nature of the overlap. There are four distinct cases that are to be considered. FIGS. 10A, 10B, 10C and 10D respectively illustrate the four cases for the relationships between the requirement profiles and the anticipation profiles. In FIGS. 10A–10D, the requirement profiles 1004 include parameters $x_3$, $x_4$ for the ith DDP, and the anticipation profiles 1002 include the parameters $x_1$, $x_2$ for the ith DDP. The variation in the overlap volumes are represented by shaded areas, as a function of the relationship between anticipation and requirement profiles. In other words, parameters $x_1$, $x_2$ denote values at which the ith DDP anticipation profile preference level becomes non-zero, and reaches one respectively, with $x_3$, $x_4$ denoting the equivalent values for requirement profiles. The parameter $x_5$ is the value at which the ith DDP anticipation profile preference level again becomes zero.

After the appropriate scenario is determined, the overlap area can be separated into one, two or three triangular/trapezoidal areas (corresponding to volumes) as shown in FIGS. 10A–10D.

Figure 11:
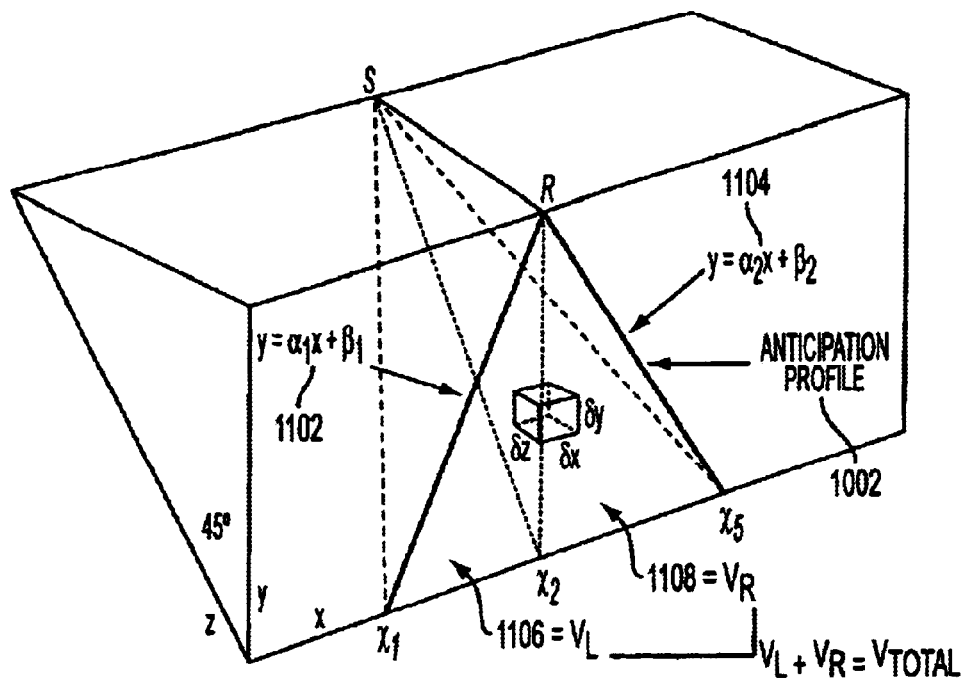
FIG. 11 illustrates the wedge of FIG. 8 with the parameters of FIGS. 10A–10D.

FIG. 11 illustrates the wedge of FIG. 8 with the parameters of FIGS. 10A–10D. Anticipation profile 1002 includes two sectors 1102 and 1104. The following description pertains to calculating the total projected volume of the anticipated DDP fuzzy profile for a given concept. This is the denominator portion of the Feasibility Index. While a specific exact form solution is provided, those skilled in the art will recognize that other methods can be used as well.

To illustrate the computation of the denominator portion of the Feasibility Index, the left-hand side triangular profile 1106 ($x_1 \leq x \leq x_2$) is considered. The projected volume of this profile, to $V_L$, is found by integrating the volume $\delta x \delta y \delta z$ (shown in FIG. 11) between the limits of the anticipation profile and the inclined plane, as $$V_L = \int_{x=x_1}^{x_2} \int_{y=0}^{a_1+b_1} \int_{z=0}^{y} dx\,dy\,dz \qquad (1)$$

Expanding this integral, $$V_L = \frac{1}{6}[a_1^2 x^3 + 3a_1\beta_1 x^3 + 3\beta_1^2 x^3]_{x_1}^{x_2}$$

where $$[\ ]_{x_1}^{x_2}$$

denotes evaluation of this volume between $x=x_1$ and $x=x_2$. This results in $$V_L = \frac{1}{6}\{a_1^2(x_2^3 - x_1^3) + 3a_1 b_1(x_2^2 - x_1^2) + 3b_1^2(x_2 - x_1)\} \qquad (2)$$

The projected volume of the right-hand ($x_2 \leq x \leq x_5$) triangular profile 1108, labeled $V_R$, can be evaluated in the same way, yielding $$V_R = \frac{1}{6}\{a_2^2(x_5^3 - x_2^3) + 3a_2 b_2(x_5^2 - x_2^2) + 3b_2^2(x_5 - x_2)\} \qquad (3)$$

where, $$x_1 = \frac{-\beta_1}{\alpha_1}; \quad x_2 = \frac{1-\beta_1}{\alpha_1}; \quad x_3 = \frac{-\beta_\pi}{\alpha_\pi}; \quad x_5 = \frac{-\beta_2}{\alpha_2} \qquad (4)$$

The total projected volume of the ith DDP with predicted profile as shown in FIG. 11, $V_{TOTAL(i,n)}$, (that is, the denominator of the feasibility index for the ith DDP and nth design concept, $FI_{(i,n)}$) is then the sum of these two volumes, namely $$V_{TOTAL(i,n)} = V_L + V_R \qquad (5)$$

Rewriting the above Equations 2 and 3 using Equation 4, Equation 5 becomes $$V_{TOTAL(i,n)} = \frac{\alpha_2 - \alpha_1}{6\alpha_1 \alpha_2} \qquad (6)$$

The following description pertains to calculating the projected overlap volume between the anticipated DDP fuzzy profile and the required DDP fuzzy profile for a given concept in the above-noted weighted wedge scenario. This is the numerator portion of the Feasibility Index. While a specific exact form solution is provided, those skilled in the art will recognize that other methods can be used as well.

The numerator of $FI_{(i,n)}$, the predicted overlap volume for the ith DDP of the nth design concept, $V_{OVERLAP(i,n)}$, can be evaluated in similar fashion. In this case, the overlap volume for any particular case depends upon the relationship between anticipation and requirement profiles. Once an applicable case (FIGS. 10A–10D) is determined, the overlap volume can be evaluated as the sum of two or three triple (volume) integrals, corresponding the shaded portions of FIGS. 10A–10D.

The resulting volume integrals have the same form, as follows:

$$V_{OVERLAP(i,n)} = \left[\frac{A^2 x^3}{6} + \frac{ABx^2}{2} + \frac{B^2 x}{2}\right]_{x=x_L}^{x_U} \quad (7)$$

where A and B are the gradient and intercept of either the anticipation or requirement profiles (depending on the applicable case), and $x_L$ and $x_U$ denote lower and upper limits of any particular integral. For the four possible scenarios represented in FIGS. 10A–10D, the parameters A, B, $x_L$ and $x_U$ are given in Table 4, where $$X_{mid1} = \frac{\beta_1 - \beta_\pi}{\alpha_\pi - \alpha_1}; \quad X_{mid2} = \frac{\beta_2 - \beta_\pi}{\alpha_\pi - \alpha_2} \quad (8)$$

TABLE 4

| Figure/variables | Volume 1 | Volume 2 | Volume 3 |
|---|---|---|---|
| FIG. 10A | | | |
| A | $\alpha_\pi$ | $\alpha_2$ | not applicable |
| B | $\beta_\pi$ | $\beta_2$ | not applicable |
| $x_L$ | $x_3$ | $X_{mid2}$ | not applicable |
| $x_U$ | $X_{mid2}$ | $x_5$ | not applicable |
| FIG. 10B | | | |
| A | $\alpha_1$ | $\alpha_\pi$ | $\alpha_2$ |
| B | $\beta_1$ | $\beta_\pi$ | $\beta_2$ |
| $x_L$ | $x_1$ | $X_{mid1}$ | $X_{mid2}$ |
| $x_U$ | $X_{mid1}$ | $X_{mid2}$ | $x_5$ |
| FIG. 10C | | | |
| **represents complete compliance | | | |
| FIG. 10D | | | |
| A | $\alpha_\pi$ | $\alpha_1$ | $\alpha_2$ |
| B | $\beta_\pi$ | $\beta_1$ | $\beta_2$ |
| $x_L$ | $x_3$ | $X_{mid1}$ | $x_2$ |
| $x_U$ | $X_{mid1}$ | $X_2$ | $x_5$ |

It should be noted that the scenario in FIG. 10C represents complete compliance (the anticipation profile is completely contained within the requirement profile). A concept satisfying this condition has a feasibility index of one.

Table 2 together with Equations 7 and 8 yields $V_{OVERLAP\,(i,n)}$ for any scenario. The Feasibility Index for the ith DDP and nth design concept is then $$FI_{(i,n)} = V_{OVERLAP(i,n)} / V_{TOTAL(i,n)} \quad (9)$$

with $V_{TOTAL(I,n)}$ given by Equations 2 through 5.

To illustrate application of the above technique, consider the reliability requirement and anticipation profiles (for design Alternatives 1 and 2) represented graphically in FIG. 7. The algebraic representations for the anticipation profiles are:

Prediction (for an exemplary concept 1)

| | |
|---|---|
| y = 0 | x ≤ 39,400 or ≥ 41,700 |
| y = x/1600 − 197/8 | 39,400 ≤ x ≤ 41,000 |
| y = 417/7 − x/700 | 41,000 ≤ x ≤ 41,700 |

Prediction (for an exemplary concept 2)

| | |
|---|---|
| y = 0 | x ≤ 37,000 or ≥ 41,700 |
| y = x/2200 − 185/11 | 37,000 ≤ x ≤ 39,200 |
| y = 103/5 − x/2000 | 39,200 ≤ x ≤ 41,200 |

FI computation for reliability yields the results reflected in Table 5. To accelerate the assessment and selection of system concepts, threshold compliance between required and anticipated parameter values can be defined. This minimum threshold is expressed as a percentage and called the Feasibility Threshold. The concept is important and offers flexibility, since the more critical parameters can be assigned higher thresholds, requiring greater compliance. Assuming a feasibility threshold of 85% for reliability in the present example, both alternatives in FIG. 7 are feasible from a reliability perspective.

TABLE 5

| System Concepts | Feasibility Index |
|---|---|
| Alternative 1 | 0.86 |
| Alternative 2 | 1.00 |

IV. Step 406: Rating and Ranking Feasbile Design Concepts a. Introduction to Rating and Ranking The rating and ranking of feasible design concepts is accomplished by consolidating DDP relative priorities with the corresponding Feasibility Index values. The DDP relative priorities are computed by normalizing absolute priorities.

Absolute DDP priority is a function of its correlation with customer requirements and their 15 importance. Accordingly, absolute priority of the ith DDP, $I_i$, may be expressed as:

$$I_i = \sum_{k=1}^{k=n} (Customer\ Requirement\ Importance)_k (Correlation)_{ki}$$

Absolute priority is normalized to yield the corresponding relative priorities as:

$$RI_i = \frac{I_i}{\sum_{i=1}^{i=m} I_i} = \frac{\sum_{k=1}^{k=n}(Customer\ Requirement\ Importance)_k (Correlation)_{ki}}{\sum_{i=1}^{i=m}\sum_{k=1}^{k=n}(Customer\ Requirement\ Importance)_k (Correlation)_{ki}}$$

where $RI_i$ represents the relative priority of the ith DDP. This formulation assumes that there are a total of m DDPs, and that the ith DDP impacts n customer requirements.

The overall merit for each feasible design concept is computed by consolidating relevant DDP relative priorities and associated Feasibility Index values. This is expressed as:

$$MR_{C_1} = \left( \sum_{i=1}^{i=m} (RI_i)(FI_{C_1 i}) \right)$$

where $MR_{C1}$ represents the merit rating of Design Concept 1. $RI_i$ is the relative importance of the ith DDP and $FI_{C1i}$ is the feasibility index of the ith DDP as it applies to Concept 1. Overall merit is a unitless fuzzy number and its imprecision is a function of the uncertainty associated with the inputs. These overall merit profiles represent relative goodness, facilitate focused design iteration, and guide commitment to a preferred concept. After reviewing the analysis and evaluation results, the design team may decide to utilize the knowledge gained as a basis for revisiting the design situation.

a. Sensitivity Analysis

The basic research using the weighted wedge methodology to analyze design concepts from a feasibility perspective involve a linear project plane, as reflected in FIG. I 1. From a designer's perspective, replacement of a linear projection plane with a non-linear projection plane would reveal greater distinctions between design concepts, since the projection plane can be tailored to provide proportionally greater volumes at higher preference levels, where non-overlap is significantly more critical. The approach used in this portion of the invention is analogous to Taguchi's concept of "loss" reflecting the deviation between preferred/required values and actual values.

FIGS. 9A and 9B illustrate a non-linear inclination plane and feasibility indices thereof for two concepts. First, FIG. 9A reflects the notion of a non-linear projection plane. An obvious non-linear inclination plane $z=y^n$, where y represents the preference level ($0 \leq y \leq 1$). Since the objective is to enhance the ability of the FI to distinguish between alternative design concepts, the only non-linear profiles of interest are those for which n is a positive integer. Such profiles automatically satisfy the requirement of generating a significantly greater projected volume for a unit area, the higher the preference level associated with that area. The greater the value of n, the more pronounced the distinction between the overlap volumes with equal areas, at different locations becomes.

Non-linear profiles such as those shown in FIG. 9A all exhibit a noticeable change in gradient at approximately z=0.05. This offers the possibility of tailoring the projection plane. This analysis was performed for the Reliability parameter of two design concepts (A and B) constructed with equivalent areas of non-overlap at different preference levels.

A numerical feasibility assessment yields the results shown in FIG. 9B. For Concept A, the area of non-overlap is almost all at a higher preference level than for Concept B. As n increases, the non-overlap volumes (and hence the FI) for the design alternative diverge. That is, the difference between FIs for Concepts A and B should be greater for n=10, than when n=2, as shown in FIG. 9B.

It should be noted that the polynomial projection profiles used in the analysis are similar to Taguchi loss functions, where the loss function L(y) is used to quantify the variability present in a process. Mathematically, $L(y)=k(y-m)^2$ where y is some quality characteristic, m is the target value of y and k is the quality loss coefficient.

V. Computer Implementations of the Present Invention

The above-described present invention can be implemented in hardware, software, or any combination thereof and may be implemented in a computer system or other processing system. The following merely describes exemplary environments.

In one embodiment, the invention is directed toward a computer system capable of carrying out the functionality described herein. The exemplary computer system can include one or more processors. The processor may be connected to a communication bus. Various software embodiments are described in terms of this example computer system. After reading this description, it will become apparent to a person skilled in the relevant art how to implement the invention using other computer systems and/or computer architectures.

The computer system can also include a main memory, preferably random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit represents a floppy disk, magnetic tape, optical disk, etc. which is read by and written to by removable storage drive. As will be appreciated, the removable storage unit can include a computer usable storage medium having stored therein computer software and/or data.

In alternative embodiments, the secondary memory may include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to computer system.

The exemplary computer system can also include a communications interface. This communications interface allows software and data to be transferred between computer system and external devices. Examples of the communications interface can include a modem, a network interface (such as an Ethernet card), a communications port, a PCM-CIA slot and card, etc. Software and data transferred via communications interface are in the form of signals which can be electronic, electromagnetic, optical or other signals capable of being received by communications interface. These signals are provided to communications interface via a channel, for example. This channel carries signals and can be implemented using wire or cable, fiber optics, a phone line, a cellular phone link, an RF link and other communications channels.

The computer system can also includes a graphics pipeline. The graphics pipeline comprises the hardware and software that take input commands and produce therefrom data in the format of pixels. The pixels are output to frame buffer. The frame buffer varies from a simple buffer capable of storing two-dimensional images, to a state-of-the-art device capable of displaying textured, three-dimensional, color images. A Scan-out device can comprise rendering hardware that selectively reads the pixels from the frame buffer and transmits the pixels to display. The display, comprising for example a cathode ray tube (CRT), provides a physical display of the pixels. The scan-out device and display comport in function with the sophistication of the frame buffer.

In this invention, the terms "computer program medium" and "computer usable medium" are used to generally refer to media such as removable storage device, a hard disk installed in hard disk drive, and signals. These computer program products are means for providing software to a computer system.

Computer programs (also called computer control logic) are stored in main memory and/or a secondary memory. Computer programs can also be received via a communications interface. Such computer programs, when executed, enable the computer system to perform the features of the present invention as discussed herein. In particular, the computer programs, when executed, enable a processor to perform the features of the present invention. Accordingly, such computer programs represent controllers of the computer system.

In an embodiment where the invention is implement using software, the software may be stored in a computer program product and loaded into computer system using a removable storage drive, hard drive or communications interface. The control logic (software), when executed by the processor causes the processor to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While the invention has been particularly shown and described with reference to preferred embodiments thereof, it will be understood by those skilled in the relevant art that various changes in form and details may be made therein without departing from the spirit and scope of the invention.

What is claimed is:

1. A method for determining compliance for a feasible design dependent parameter (DDP) between an anticipated DDP fuzzy profile and a required DDP fuzzy profile, comprising:

creating a weighted wedge by projecting an image of a surface common to the anticipated DDP fuzzy profile and the required DDP fuzzy profile at an angle from said surface; and finding an overlap volume of said weighted wedge between a projection of the anticipated DDP fuzzy profile onto said image and a projection of the required DDP fuzzy profile onto said image and wherein said volume of said anticipated DDP fuzzy profile is precisely measured using the formula $$V_{TOTAL(l,n)} = V_L V_R$$

wherein $$V_R = \frac{1}{6}\{a_2^2(x_5^3 - x_2^3) + 3a_2b_2(x_5^2 - x_2^2) + 3b_2^2(x_5 - x_2)\}$$

and $$V_L = \frac{1}{6}\{a_1^2(x_2^3 - x_1^3) + 3a_1b_1(x_2^2 - x_1^2) + 3b_1^2(x_2 - x_1)\}.$$

2. The method according to claim 1, wherein said angle is calculated in a manner to make said overlap volume greater if any one of the anticipated DDP fuzzy profile and the required DDP fuzzy profile have projections with higher respective preference levels.

3. The method according to claim 1, further compromising:

generating a feasibility index for said DDP by dividing said overlap volume by a volume obtained from said projection of the anticipated DDP fuzz profile.

4. The method according to claim 1, wherein said common surface is a linear projection plane.

5. The method according to claim 1, wherein said common surface is a non-linear projection plane designed to provide relatively greater differences between one or more of said overlap volumes at higher respective preference levels for any one of the anticipated DDP fuzzy profiles and the required DDP fuzzy profiles.

6. The method according to claim 1, further comprising:

determining a feasible design space for a design concept by finding one or more DDPs for said concept;

determining one or more feasible DDPs for said design space, comprising applying said creating step and said finding step one or more times, and rating and ranking feasible design concepts by consolidating relative priorities of said one or more feasible DDPs.

7. The method according to claim 6, wherein said feasible design space determining step comprises:

determining a fuzzy quality function deployment (QFD) parameter comprising said DDPs.

8. The method according to claim 6, wherein said feasible design space determining step comprises any one of:

determining an Improvement Potential and Necessity (IPN) measure providing insight into an extent of improvement desirable and necessary for each said DDP; and determining a Tolerance of Fuzziness (TOF) measure providing insight into how much fuzziness can be tolerated by each said DDP.

9. The method according to claim 6 wherein said determining one or more feasible DDPs step comprises:

generating one or more feasibility indices for said one or more feasible DDPs by dividing overlap volumes thereof by volumes obtained from projections of anticipated DDP fuzzy profiles thereof, and wherein said rating and ranking step comprises:

consolidating relative priorities of said one or more feasible DDPs with said one or more feasibility indices.

10. The method according to claim 1, wherein the finding step comprises:

calculating said overlap volume of said weighted wedge $$\left[\frac{A^2x^3}{6} + \frac{ABx^2}{2} + \frac{B^2x}{2}\right]_{x=x_L}^{x_U}$$

where A and B respectively represent gradients of either said anticipated DDP fuzzy profile or said required DDP fuzzy profile, wherein $x_L$, represents a lower integral limit for said variable x, and wherein $x_U$ represents an upper integral limit for said variable x.

11. The method according to claim 1, wherein the DDP is selected from the group consisting of:
reliability;
maintainability;
environmental compliance;
visual quality;
data transfer rate;
audio/visual synchronization;
color capability;
skill level for operation;
skill level for maintenance;
audio quality;
communication initiation time;
maximum group size;
simultaneous groups active;
maximum membership size;
design/production cost;
operating cost;
support cost;
maintenance cost;
safety;
disposability; and
communication security.

12. A system for determining compliance for a feasible design dependent parameter (DDP) between an anticipated DDP fuzzy profile and a required DDP fuzzy profile, comprising:
creating device that creates a weighted wedge by projecting an image of a surface common to the anticipated DDP fuzzy profile and the required DDP fuzzy profile at an angle from said surface; and
an overlap finding device that finds an overlap volume of said weighted wedge between a projection of the anticipated DDP fuzzy profile onto said image and projection of the required DDP fuzzy profile onto said image and
wherein said volume of said anticipated DDP fuzzy profile is precisely measured using the formula $$V_{TOTAL(l,n)} = V_L + V_R$$

wherein $$V_R = \frac{1}{6}\{a_2^2(x_5^3 - x_2^3) + 3a_2 b_2(x_5^2 - x_2^2) + 3b_2^2(x_5 - x_2)\}$$

and $$V_L = \frac{1}{6}\{a_1^2(x_2^3 - x_1^3) + 3a_1 b_1(x_2^2 - x_1^2) + 3b_1^2(x_2 - x_1)\}.$$

13. The system according to claim 12, wherein said angle is calculated in a manner to make said overlap volume greater if any one of the anticipated DDP fuzzy profile and the required DDP fuzzy profile have projections with higher respective preference levels.

14. The system according to claim 12, further comprising:
feasibility index generating device that generates a feasibility index for said DDP by dividing said overlap volume by a volume obtained from said projection of the anticipated DDP fuzzy profile.

15. The system according to claim 12, wherein said common surface is a linear projection plane.

16. The system according to claim 12, wherein said common surface is a non-linear projection plane designed to provide relatively greater differences between one or more of said overlap volumes at higher respective preference levels for any one of the anticipated DDP fuzzy profiles and the required DDP fuzzy profiles.

17. The system according to claim 12, further comprising:
first device that determines a feasible design space for a design concept by finding one or more DDPs for said concept;
second device that determines one or more feasible DDPs for said design space, comprising applying said creating step and said finding step one or more times; and
third device that rates and ranks feasible design concepts by consolidating relative priorities of said one or more feasible DDPs.

18. The system according to claim 17, wherein said first device comprises:
device that determines a fuzzy quality function deployment (QFD) parameter comprising said DDPs.

19. The system according to claim 17, wherein said first device comprises any one of:
device that determines an Improvement Potential and Necessity (IPN) measure providing insight into an extent of improvement desirable and necessary for each said DDP; and
device that determines a Tolerance of Fuzziness (TOF) measure providing insight into how much fuzziness can be tolerated by each said DDP.

20. The system according to claim 17, wherein said second device comprises:
device that generates one or more feasibility indices for said one or more feasible DDPs by dividing overlap volumes thereof by volumes obtained from projections of anticipated DDP fuzzy profiles thereof, and wherein said third device comprises:
device that consolidates relative priorities of said one or more feasible DDPs with said one or more feasibility indices.

21. The system according to claim 12, wherein said overlap finding device comprises:
a device that calculates said overlap volume of said weighted wedge as $$\left[\frac{A^2 x^3}{6} + \frac{ABx^2}{2} + \frac{B^2 x}{2}\right]_{x=x_L}^{x_U}$$

where A and B respectively represent gradients of either said anticipated DDP fuzzy profile or said required DDP fuzzy profile,
wherein $x_L$ represents a lower integral limit for said variable x, and
wherein $x_U$ represents an upper integral limit for said variable x.

22. The system according to claim 12, wherein the DDP is selected from the group consisting of:
reliability;
maintainability;
environmental compliance;
visual quality;
data transfer rate;

audio/visual synchronization;
color capability;
skill level for operation;
skill level for maintenance;
audio quality;
communication initiation time;
maximum group Size;
simultaneous groups active;
maximum membership size;
design/production cost;
operating cost;
support cost;
maintenance cost;
safety;
disposability; and
communication security.

23. A computer program product for determining compliance for a feasible design dependent parameter (DDP) between an anticipated DDP fuzzy profile and a required DDP fuzzy profile, wherein said computer program product comprises a computer useable medium having computer program logic stored therein, said computer program logic comprising:

means for enabling a computer to create a weighted wedge by projecting an image of a surface common to the anticipated DDP fuzzy profile and the required DDP fuzzy profile at an angle from said surface; and means for enabling a computer to find an overlap volume of said weighted wedge between a projection of the anticipated DDP fuzzy profile onto said image and a projection of the required DDP fuzzy profile onto said image and wherein said volume of said anticipated DDP fuzzy profile is precisely measured using the formula $$V_{TOTAL(I,n)} = V_L + V_R$$

wherein $$V_R = \frac{1}{6}\{a_2^2(x_5^3 - x_2^3) + 3a_2 b_2(x_5^2 - x_2^2) + 3b_2^2(x_5 - x_2)\}$$

and $$V_L = \frac{1}{6}\{a_1^2(x_2^3 - x_1^3) + 3a_1 b_1(x_2^2 - x_1^2) + 3b_1^2(x_2 - x_1)\}.$$

* * * * *